(12) United States Patent
Ribigini et al.

(10) Patent No.: US 12,522,284 B2
(45) Date of Patent: Jan. 13, 2026

(54) CONTROL SYSTEM FOR A ROAD VEHICLE AND RELATIVE CONTROL METHOD

(71) Applicant: FERRARI S.P.A., Modena (IT)

(72) Inventors: Marco Guglielmo Ribigini, Modena (IT); Matteo Lanzavecchia, Modena (IT)

(73) Assignee: FERRARI S.P.A., Modena (IT)

( * ) Notice: Subject to any disclaimer, the term of this patent is extended or adjusted under 35 U.S.C. 154(b) by 505 days.

(21) Appl. No.: 18/313,819

(22) Filed: May 8, 2023

(65) Prior Publication Data

US 2023/0365188 A1    Nov. 16, 2023

(30) Foreign Application Priority Data

May 12, 2022    (IT) .................... 102022000009836

(51) Int. Cl.
*B62D 6/00* (2006.01)
*B62D 1/12* (2006.01)
(Continued)

(52) U.S. Cl.
CPC ............... *B62D 6/007* (2013.01); *B62D 1/12* (2013.01); *B62D 5/00* (2013.01); *B60K 35/10* (2024.01); *B60K 2360/135* (2024.01)

(58) Field of Classification Search
CPC . B62D 6/007; B62D 1/12; B62D 5/00; B60K 35/10; B60K 2360/135; G05G 1/01; G05G 9/047; B60W 30/02; B60W 30/18145; B60W 10/04; B60W 10/18; B60W 10/20; B60W 10/22
(Continued)

(56) References Cited

U.S. PATENT DOCUMENTS 6,823,245 B2    11/2004    Sugitani et al.
8,165,756 B2    4/2012    Yasui et al.
(Continued)

FOREIGN PATENT DOCUMENTS

DE    102018214502 A1    4/2020

OTHER PUBLICATIONS

Italian Search Report for Application No. 102022000009836; Filing Date: May 12, 2022; Date of Mailing—Jan. 26, 2023, 7 pages.
(Continued)

*Primary Examiner* — Hai H Huynh
(74) *Attorney, Agent, or Firm* — CANTOR COLBURN LLP

(57) ABSTRACT

Control system for a road vehicle comprising a first joystick provided with a first lever and with first sensor elements to detect a kinematic value or a force imparted by the driver along a first direction and a second direction; and/or a second joystick provided with a second lever and with second sensor elements to detect the kinematic value or the force imparted along the first direction and the second direction; a control unit configured to control the steering of the road vehicle as a function of the kinematic value or of the force detected by the first lever and/or by the second lever along the first direction; and the attitude of the road vehicle as a function of the kinematic value or of the force detected by the first sensor elements and/or the second sensor elements along the second direction.

15 Claims, 5 Drawing Sheets

(51) Int. Cl.
*B62D 5/00* (2006.01)
*B60K 35/10* (2024.01)

(58) Field of Classification Search
USPC .......................................... 701/41, 42, 43, 44
See application file for complete search history.

(56) References Cited

U.S. PATENT DOCUMENTS

| | | | |
|---|---|---|---|
| 9,254,866 | B2 | 2/2016 | Dawson et al. |
| 9,797,114 | B2 * | 10/2017 | Maifield ............... E02F 9/2012 |
| 10,145,084 | B2 * | 12/2018 | Fredrickson .......... E02F 9/2012 |
| 11,634,885 | B2 * | 4/2023 | Velde ................... F16F 15/002 |
| | | | 701/50 |
| 2004/0016294 | A1 * | 1/2004 | Sugitani ................. B60T 8/172 |
| | | | 73/146 |
| 2005/0143884 | A1 | 6/2005 | Bihler et al. |
| 2011/0224872 | A1 | 9/2011 | Reed |
| 2015/0143884 | A1 | 5/2015 | Heaton et al. |
| 2018/0058039 | A1 | 3/2018 | Fredrickson et al. |
| 2021/0039494 | A1 | 2/2021 | Nageshkar et al. |

OTHER PUBLICATIONS

Extended European Search Report for European Patent Application No. 23172774.4, Date of Mailing Sep. 12, 2023, 5 pages.

* cited by examiner

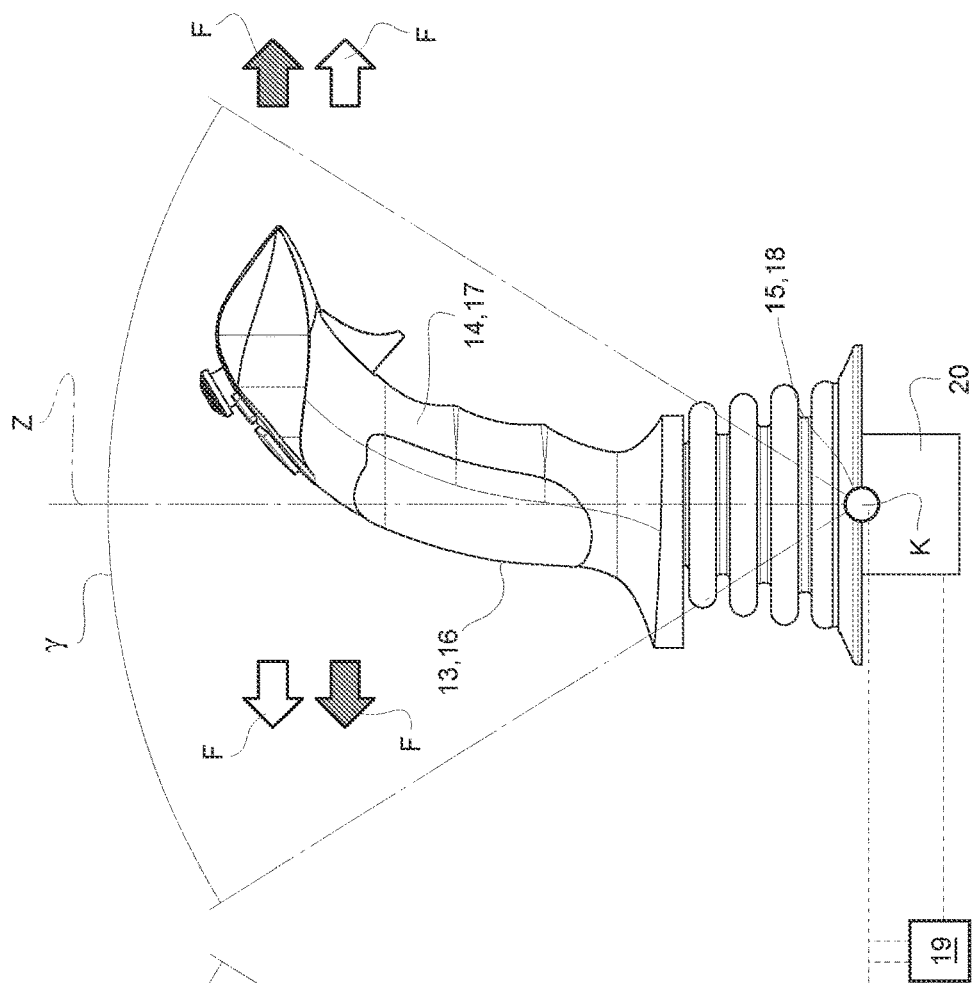
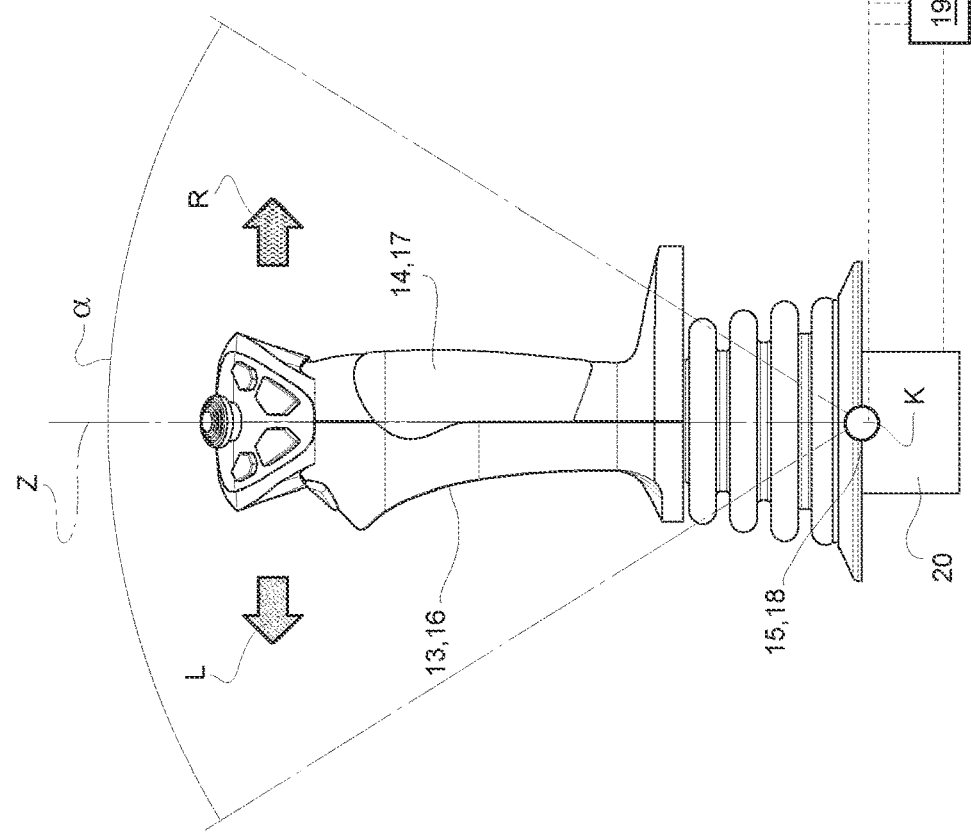
FIG. 4
FIG. 5

CONTROL SYSTEM FOR A ROAD VEHICLE AND RELATIVE CONTROL METHOD

CROSS-REFERENCE TO RELATED APPLICATIONS

This patent application claims priority from Italian patent application no. 102022000009836 filed on May 12, 2022, the entire disclosure of which is incorporated herein by reference.

TECHNICAL FIELD

The invention relates to a control system for a road vehicle and to a relative control method.

In particular, the invention finds advantageous, though not exclusive application in high-performance cars, to which explicit reference will be made in the description below without because of this losing in generality.

BACKGROUND OF THE INVENTION

As it is known, cars are generally controlled by means of a steering wheel. In the past and because of merely stylistic issues, manufacturers used to offer steering wheels with the shape of a yoke (of the kind used, for example, in an aircraft), though without allowing the steering wheel to move backward and forward, since it evidently is not possible to control the pitch of a car.

The steering wheel historically owes its conformation to the need to reduce the stressed suffered by the driver's arms in controlling the front wheels. Over the decades, servo-mechanisms were introduced to control the steering, said servo mechanisms being, at first, hydraulic and, more recently, electric. Therefore, a reduction of the size, namely of the diameter, of the steering wheel was possible.

In the industrial field, a joystick is known, which is used to control forklifts. However, these vehicles feature dynamics that are very different from the ones of a car, especially of a sports car, and, therefore, the relative control system is designed to move the forklifts in very small spaces and at very low speeds.

Italian patent application no. 102018000004929 describes a method to control a car using a joystick, which allows both the movement/stopping of the car and the trajectory followed by the car to be controlled; in particular, the forward or backward tilt angle of the joystick lever causes a corresponding forward or backward acceleration of the car (forward to increase the speed of the car or backward to reduce the speed of the car), whereas the lateral tilt angle (to the right or to the left) of the joystick lever causes a corresponding steering of the car.

In case of high-performance vehicles, the control of the car starting from the sole joystick can turn out to be particularly complicated, especially in case the car has to be used on a racing track.

Italian patent application no. 102018000021097 discloses a control method for a car, which uses a joystick to control the trajectory of the vehicle and pedals to control the attitude thereof.

However, even though the adjustment of the attitude by means of pedals (similarly to what happens with helicopters) is functionally and structurally valid, the Applicant thinks that it can be further improved, in particular in terms of simplicity of learning for a driver who has to shift from a common vehicle provided with a steering wheel to a high-performance vehicle controlled by means of a joystick.

DESCRIPTION OF THE INVENTION

The object of the invention is to provide a control system for a road vehicle and a relative control method, which are at least partially free from the drawbacks described above and, at the same time, are simple and economic to be manufactured and carried out.

According to the invention, there are provided a control system for a road vehicle and a relative control method as claimed in the independent claims attached hereto and, preferably, in any one of the dependent claims directly or indirectly depending on the independent claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein:

FIGS. 4 and 5 show a front view and a side view, respectively, of part of the control system of FIGS. 2 and 3.

PREFERRED EMBODIMENTS OF THE INVENTION

Figure 1:
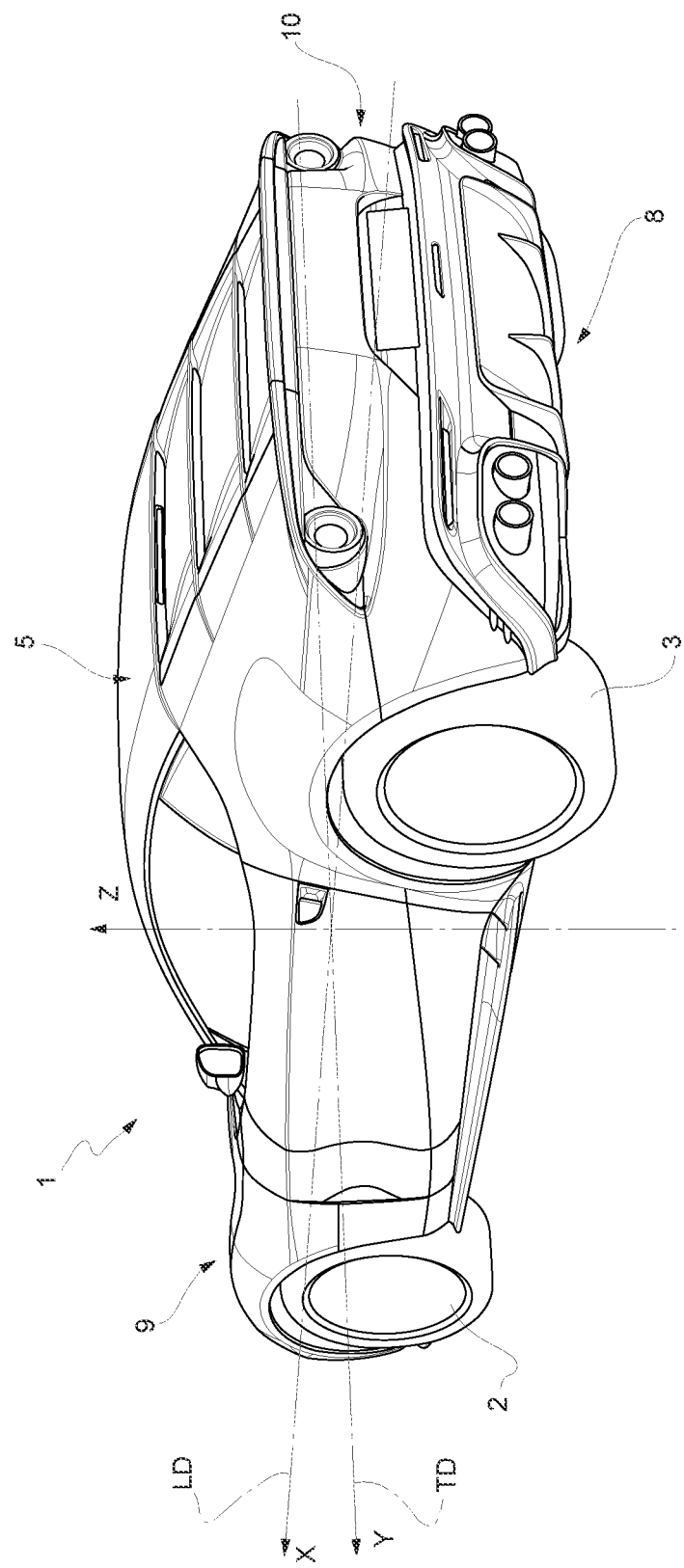
FIG. 1 is a schematic perspective view of a vehicle provided with a control system according to the invention.
Figure 2:
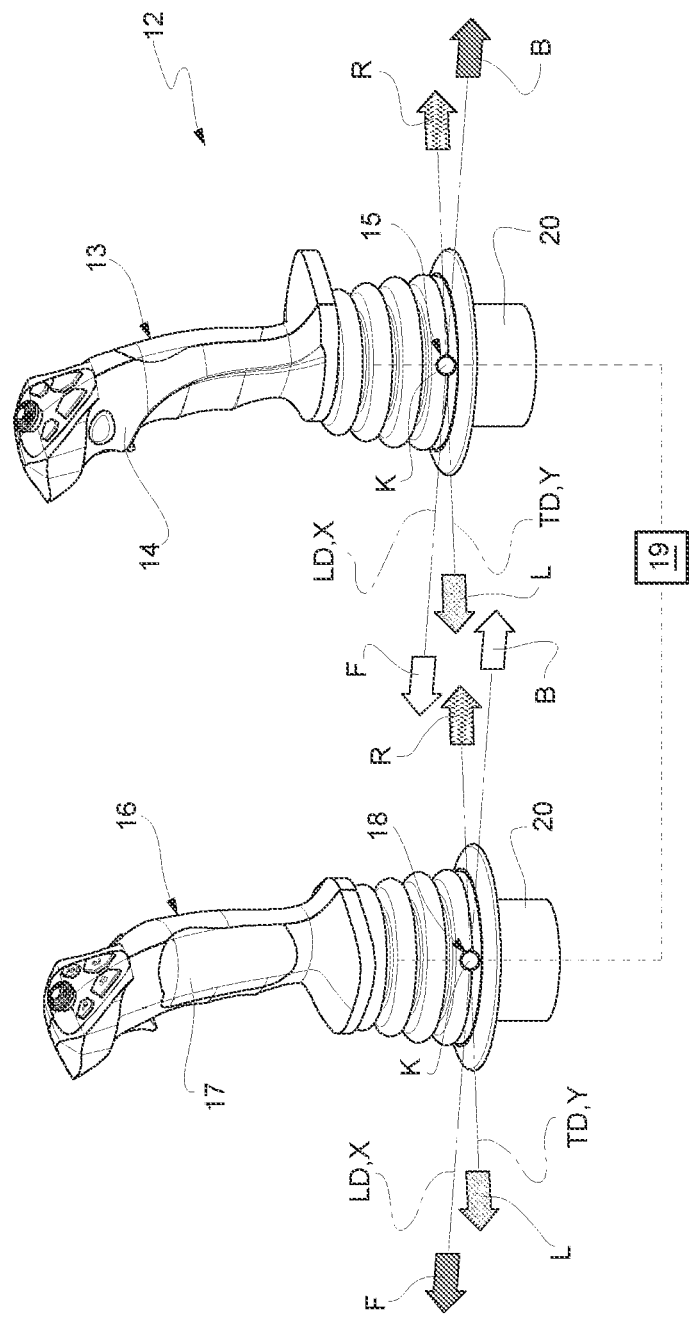
FIG. 2 is a schematic perspective view of a control system according to the invention.

In FIG. 1, number 1 generically indicates, as a whole, a road vehicle provided with two front wheels 2 and two rear wheels 3, at least a pair (or all) of them receiving the torque from a powertrain system 4. The powertrain system 4 can be an exclusively heat-based system (namely, solely comprising an internal combustion heat engine), a hybrid system (namely, comprising an internal combustion heat engine and at least one electric motor) or an electric system (namely, solely comprising one or more electric motors).

In the figures, the same numbers and the same reference letters indicate the same elements or components with the same function.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

The road vehicle 1 comprises a passenger compartment 5, where a cockpit 6 (better shown in FIG. 3) is obtained, which is suited to accommodate a driver of the road vehicle 1. In particular, the cockpit 6 comprises a seat 7 (shown in FIG. 3).

According to the preferred, though non-limiting embodiment of FIG. 1, the road vehicle 1 longitudinally extends along a longitudinal axis X, which goes through the vehicle from a rear part 8 to a front part 9. In particular, furthermore, the road vehicle 1 laterally extends along a transverse axis Y, which goes through the vehicle from a right part 10 to a left part 11. Finally, the road vehicle 1 vertically extends along a vertical axis Z, which goes through the vehicle from the floorboard to the roof of the passenger compartment 5.

Furthermore, the vehicle 1 comprises a control system 12, which is schematically shown, in a non-limiting manner, in FIGS. 2 to 5.

The control system 12 comprises a first joystick 13 provided with a first lever 14 configured to be grasped by the right hand of a driver of the road vehicle 1.

Figure 3:
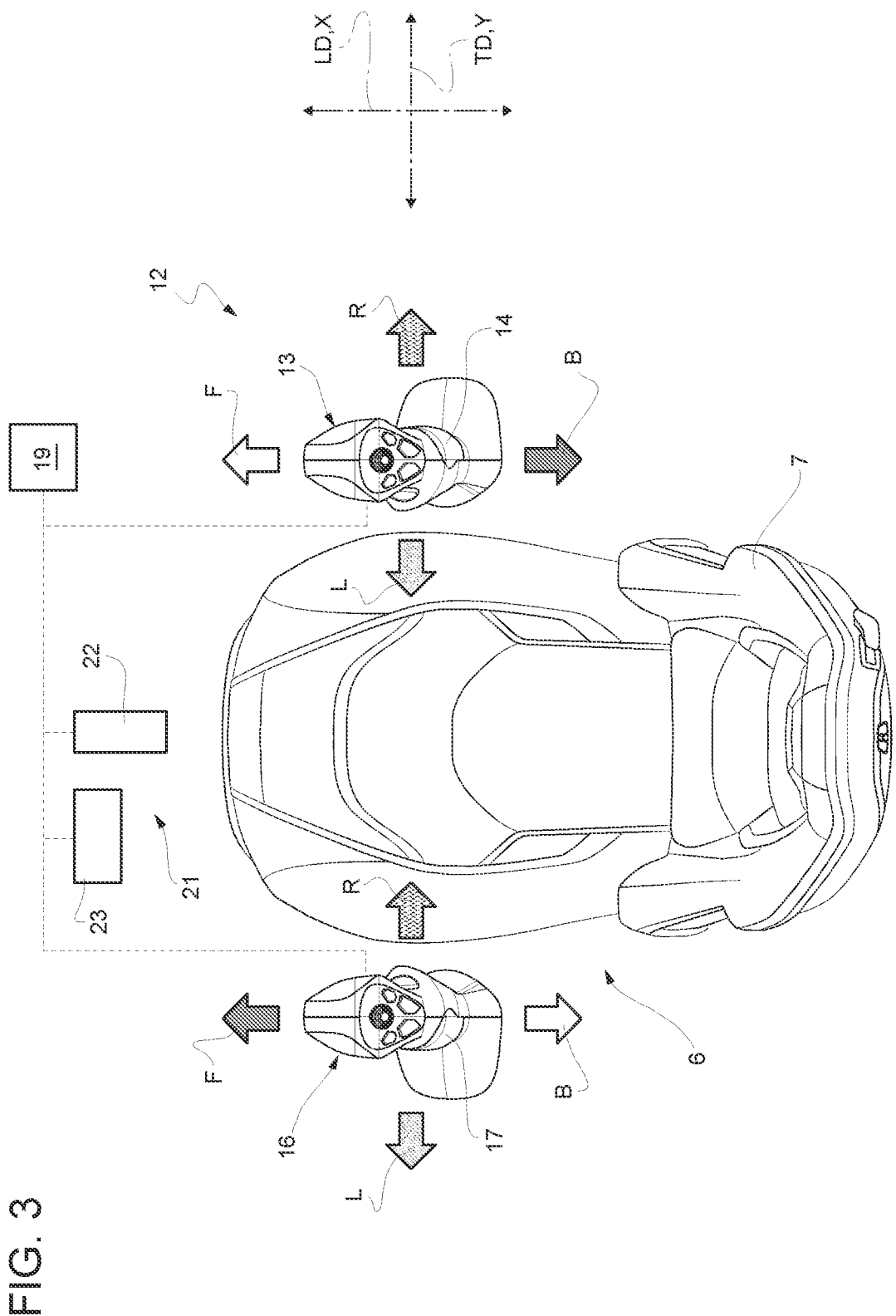
FIG. 3 is a schematic plan view of the control system of FIG. 2 housed inside the passenger compartment of the vehicle of FIG. 1, in the area of a cockpit.

In the non-limiting embodiment of FIG. 3, the first joystick 13 is arranged on the right of the seat 7 so that it can easily and comfortably be held by the right hand of the driver sitting on the seat 7.

In particular, the first joystick 13 comprises first sensor elements 15 to detect a kinematic value or a force imparted by the driver to the first lever 13 along at least a first direction TD and a second direction LD.

Preferably, though not in a limiting manner, the first direction TD extends along the transverse axis Y of the road vehicle 1, whereas the second direction LD extends along the longitudinal axis X of the road vehicle 1. Therefore, in particular, the first direction TD and the second direction LD are perpendicular to one another.

Advantageously, though not necessarily, the control system 12 further comprises a second joystick 16, which is also provided with a second lever 17, which is configured to be grasped by the left hand of the driver of the road vehicle 1.

In the non-limiting embodiment of FIG. 3, the second joystick 16 is arranged on the left of the seat 7 so that it can easily and comfortably be held by the left hand of the driver sitting on the seat 7.

In particular, the second joystick 16 comprises second sensor elements 18 to detect the kinematic value or the force imparted by the driver to the second lever along at least the first direction TD and the second direction LD.

According to some preferred non-limiting cases, the kinematic value is the angular position of the first or of the second lever 14, 17 about a spherical node K. In other words, the sensor elements 15 and 18 are configured to detect the kinematics of the levers 14 and 17, in particular at least the angular position of the levers. Preferably, though not in a limiting manner, the sensor elements 15, 18 are configured to also detect the speed and the acceleration imparted by the driver to the first lever 13 and/or to the second lever 16.

In other words, as shown in the non-limiting embodiments of FIGS. 2 to 5, the joysticks 13 and 16 are respectively provided with a lever 14, 17 that can be grasped and can be tilted longitudinally along the direction LD (namely, forward or backward) or transversely along the direction TD (namely, to he right or to the left). Therefore, the lever 14, 17 can be tilted forward (according to the direction indicated by arrow F in FIGS. 2, 3 and 5), the lever 14, 17 can be tilted backward (according to the direction indicated by arrow B in FIGS. 2, 3 and 5), the lever 14, 17 can be tilted to the right (according to the direction indicated by arrow R in FIGS. 2, 3 and 4) and the lever 14, 17 can be tilted to the left (according to the direction indicated by arrow L in FIGS. 2, 3 and 4).

Obviously, each lever 14, 17 can also be tilted combining a longitudinal movement with a transverse movement, namely each lever 14, 17 can freely be tilted in all the directions contained in a horizontal plane.

The system 12 further comprises a control unit 19 (schematically shown in the accompanying figures), which is configured to adjust a motion of the road vehicle 1 depending on the kinematic value (for example, on the angular position) or on the force imparted by the driver to the first lever 14 and/or to the second lever 17.

In particular, the control unit 19 is connected to the joysticks 13, 16 (namely, to the sensor elements 15, 18 of the joysticks 13, 16 detecting the position or the force imparted to each lever 14, 17) and controls the powertrain system 4, the braking system, possible active suspension systems and the steering system of the front wheels 2 depending on the commands imparted by the driver through at least one of the joysticks 13, 16.

Preferably, though not in a limiting manner, the control uni 19 is an electronic control unit ("ECU"), which, among other things, processes a plurality of data items and adjusts the behaviour of the road vehicle 1 both while it drives along a straight road and while it drives along a bend by acting, as described more in detail below, for example, upon the torque delivered by powertrain system 4 to the drive wheels 2 or 3 and, if necessary, in collaboration with the active shock absorbers and the braking system. The control unit 19 can physically consist of one single device or of different devices separate from one another and communicating with one another through the CAN network of the road vehicle 1.

Advantageously, the control unit 19 is configured to control the steering (namely, the right or left rotation of the front wheels 2) of the road vehicle 1 depending on the kinematic value (for example, on the angular position) or on the force detected by the first lever 14 and/or by the second lever 17 along the first direction TD, namely along the transverse axis Y of the road vehicle 1.

Therefore, the lever 14, 17 of the joysticks 13, 16 can be moved to the right and to the left (arrows R and L in FIGS. 2 to 4) controlling the trajectory of the road vehicle 1 (FIG. 6), namely controlling the degree of steering of the road vehicle 1.

Figure 6:
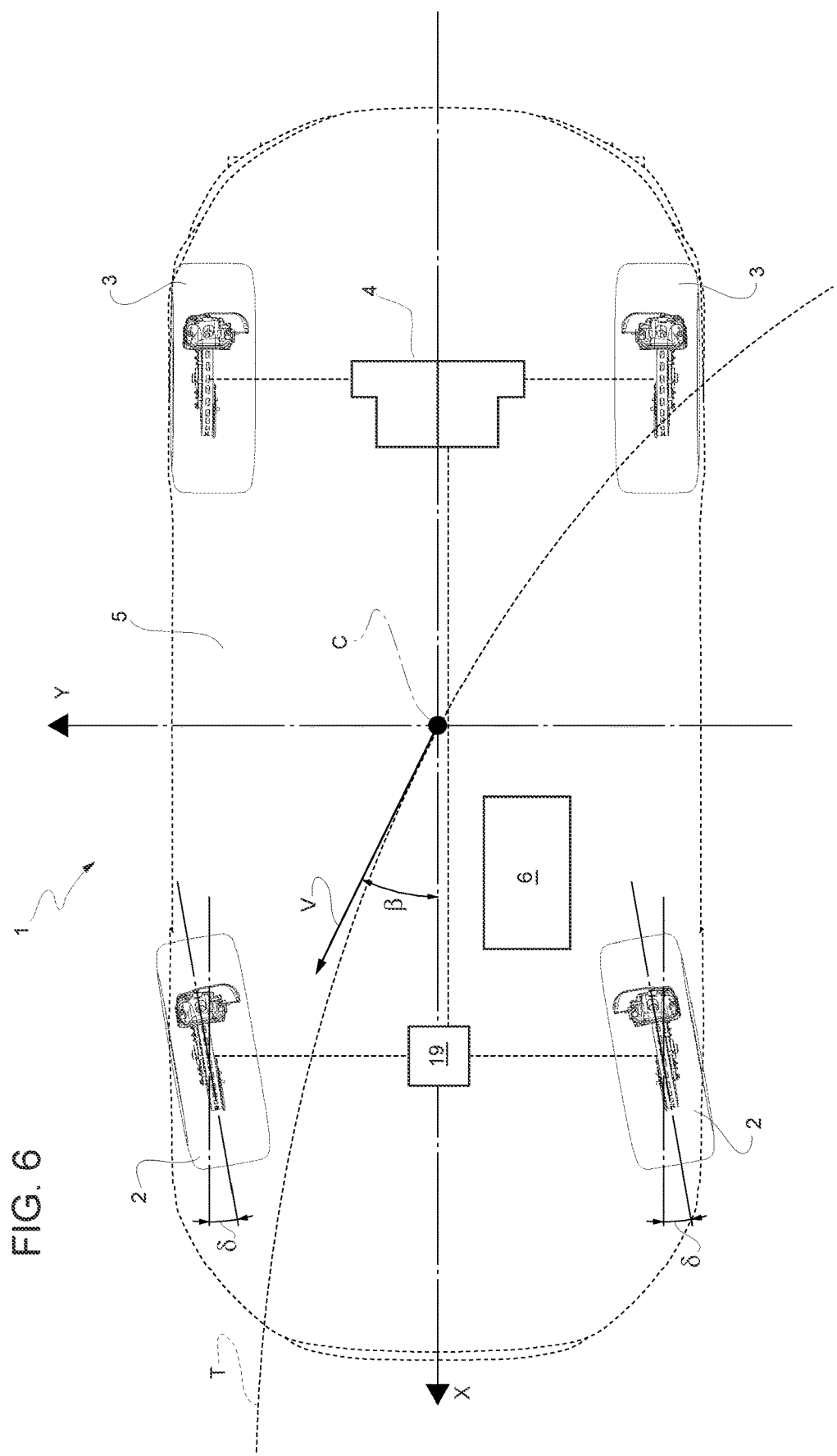
FIG. 6 is a schematic view of the car of FIG. 1 while driving along a bend, highlighting the trajectory, the driving speed and the attitude angle.

According to a non-limiting embodiment, the control unit 19 controls the motion of the road vehicle 1 so as to cause a steering angle $\delta$ to correspond to an angular position or a value of force imparted by the driver to the first lever 14 and/or the second lever 17 along the first direction TD. In other words, the lateral tilt angle $\alpha$ (FIG. 4) of the lever 14, 17 of the joystick 13, 16 directly corresponds to the steering angle $\delta$ (FIG. 6).

In particular, the proportionality factor, namely the function linking the angle $\alpha$ of the lever 14, 17 of the joystick 13, 16 to the steering angle $\delta$, can become a function of multiple known vehicle parameters, which are not described in detail.

According to a different embodiment, a lateral tilt angle $\alpha$ of the lever 14, 17 of the joystick 13, 16 identifies a rapidity with which the actuator of the steering system intervenes. Therefore, the release of the lever 14, 17 of the joystick 13, 16 leaves the steering angle $\delta$ unchanged.

Preferably, though not in a limiting manner, the proportionality factor between the lateral tilt angle $\alpha$ of the lever 14, 17 of the joystick 13, 16 and the rapidity with which the steering angle $\delta$ changes is also reduced proportionally to the speed V of the road vehicle 1, so as to make the operation of the steering control "parametric".

According to a further variant of the invention, the two steering angle control modes can alternatively be enabled based on a bistable or monostable button or based on a threshold of the driving speed V (in particular, when the driving speed threshold is exceeded, the system switches from an angle control to a control of the rapidity of change of the steering angle δ). For example, the aforesaid button can be included in the joystick 13, 16, namely on board the lever 14, 17, as shown in the accompanying figures.

Furthermore, the control unit 19 is advantageously configured to control the attitude (in particular, an attitude angle β) or the yaw of the road vehicle 1 depending on the kinematic value (for example, on the angular position) or on the force detected by the first sensor elements 15 and/or by the second sensor elements 18 along the second direction LD.

In some non-limiting cases, the control unit 19 is configured to control the motion of the road vehicle 1 so as to cause an attitude angle β or a yaw angle to correspond to an angular position (for example, to the angle γ) or to a value of force imparted by the driver to the first lever 14 and/or the second lever 17 along the second direction LD.

According to FIG. 6, when driving along a bend, the control unit 19 is configured to control (adjust, change, set) the attitude angle β of the road vehicle 1 (namely, the angle comprised between the longitudinal axis X of the road vehicle 1 and the direction of the driving speed V of the road vehicle 1 in the centre of gravity C) depending on the kinematic value (namely, on the angular position) or on the force detected by the first sensor elements 15 and/or by the second sensor elements 18 along the second direction LD.

In other words, the control unit 19 controls, depending on the kinematic value (for example, on the angle γ shown in FIG. 5) or on the force imparted by the driver to at least one lever 14, 17, the attitude angle β of the road vehicle 1 while driving along a bend, so that the attitude angle β is a function, for example, of the angular position of the levers 14 and 17 (in their rotation around the transverse axis Y, along the longitudinal axis X).

It should be pointed out that, when driving along a bend, the longitudinal sliding (slip) of the drive wheels 2, 3 and the attitude angle β of the road vehicle 1 are linked; indeed, when driving along a bend, the occurrence of a longitudinal sliding (slip), for example of the rear drive wheels 3, implies that the road vehicle 1 has an attitude angle β other than zero.

By way of example, in case the road vehicle 1 has a rear-wheel drive, while driving along a bend it has a substantially oversteering behaviour: by causing the slip of the rear drive wheels 3 when moving along a bend, the road vehicle 1 is allowed to drive along the bend itself with a given attitude angle β (i.e. with the road vehicle 1 rotated towards the inside of the bend) and with the tyres of the wheels 2 and 3 sliding towards the outside of the curve. Driving along a bend when the drive wheels 2, 3 are slipping is a particularly complicated operation, since, in this condition, the dynamic balance of the road vehicle 1 is particularly unstable and can easily lead to a 180° spin; as a consequence, this driving operation (which is very spectacular and highly appreciated by drivers) is normally performed only by professional or semi-professional drivers. On the other hand, by using the levers 14 and 17, even a relatively inexperienced driver can simply and safely ask the road vehicle 1 to set an attitude angle β other than zero.

It should be pointed out that the attitude angle β is different from the yaw angle (namely, the angle comprised between the longitudinal axis X of the road vehicle 1 and a fixed ground reference), since the road vehicle 1 can assume the same yaw angle in the plane, though assuming very different attitude angles β and vice versa.

According to some non-limiting embodiments, which are not shown herein, the control unit 19, instead of controlling the attitude angle β, controls the yaw angle depending on the kinematic value or on the force detected by the joysticks 13, 16 along the second direction LD. All considerations made in this description relating to the attitude angle β obviously also apply in case the control unit 19 controls the yaw angle.

According to a preferred embodiment, when the levers 14 and 17 are operated by the driver to obtain an attitude angle β other than zero, the control unit 19 determines a desired attitude angle β as a function, for example, of the longitudinal tilt angle position γ of the levers 14 and 17 and controls the generation of the torque so as to impart the desired attitude angle β to the road vehicle 1 when driving along the bend; for example, the control unit 19 could determine a desired longitudinal sliding of the drive wheels 3 and/or 2 as a function of the desired attitude angle β and, therefore, it could control the generation of the torque so as to impart the desired longitudinal sliding to the drive wheels 2, 3 while driving along the bend.

According to a preferred embodiment, the control unit 19 determines a maximum attitude angle $\beta_{MAX}$ while driving along each bend so as to prevent the road vehicle 1 from losing control (obviously, with a proper margin of safety, which allows the road vehicle 1 to maintain stable conditions) and, hence, causes a zero attitude angle β to correspond to the absence of action of the driver upon the levers 14, 17 in the second direction LD and causes the maximum attitude angle $\beta_{MAX}$ to correspond to the maximum action of the driver upon the levers 14, 17 in the second direction LD.

Therefore, not in a limiting manner, in a first bend, the maximum action of the driver upon the levers 14, 17 in the second direction LD can indicate an attitude angle β of 4° (since the maximum attitude angle $\beta_{MAX}$ is 4° for that bend and in those dynamic conditions), whereas, in a second bend, the maximum action of the driver upon the levers 14, 17 in the second direction LD can indicate an attitude angle β of 20° (since the maximum attitude angle $\beta_{MAX}$ is 20° for that bend and in those dynamic conditions).

It should be pointed out that the law linking the position of the action upon the levers 14, 17 in the second direction LD (for example, the angle γ) to the attitude angle β can be linear and directly proportional or it can be of a different type (for example, parabolic); namely, by acting upon the levers 14, 17 in the second direction LD, at first, the attitude angle β increases in a relatively quick manner from the zero value in order to then increase much more slowly as the maximum attitude angle $\beta_{MAX}$ gets closer.

In some preferred non-limiting cases, the first joystick 13 and the second joystick 16 comprise actuator systems 20 configured to impart to one of the first lever 14 and the second lever 17 a command corresponding to the one detected by the sensor elements 15, 18 of the other lever 17, 14 (namely, corresponding to action exerted by the driver upon the other one of the second and first lever).

Advantageously, though not necessarily and as indicated by the colouring of the arrows R and L of FIGS. 2 to 5, the first lever 14 and the second lever 17 are configured to be operated to the same side along the first direction TD. In other words, the movement of the first lever 14 to the right, in the direction indicated by arrow R, corresponds to a same movement to the right, in the direction indicated by arrow R, of the second lever 17 and vice versa. In this way, the driver can intuitively control the steering of the road vehicle 1 both with one single hand and with both hands, increasing the precision of the gesture, as each one is differently sensitive in the pulling movement relative to the pushing movement (thus allowing the driver a greater precision in the movement).

Advantageously, though not necessarily and as indicated by the colouring of the arrows F and B of FIGS. 2 to 5, the first lever 14 and the second lever 17 are configured to be operated to opposite sides along the second direction LD. In other words, the forward movement of the first lever 14, in the direction indicated by arrow F, corresponds to a same backward movement, in the direction indicated by arrow B, of the second lever 17 and vice versa. In this way, the driver can intuitively control the attitude or the yaw of the road vehicle 1 both with one single hand and with both hands, increasing the precision of the gesture, as each one is differently sensitive in the pulling movement relative to the pushing movement (thus allowing the driver a greater precision in the movement).

In particular, the control unit 19 is configured to change the attitude angle $\beta$ depending on the commands given by the driver to the levers 14 and 17 along the second direction LD. Preferably, though not in a limiting manner, in case the driver operates the right lever 14 forward (arrow F) (and/or the left lever 17 backward, arrow B), the control unit 19 is configured to control the attitude angle $\beta$ so as to have the road vehicle 1 rotate in a counterclockwise direction, namely by having the right part 10 of the road vehicle 1 move forward and the left part 11 move backward (relative to the centre of gravity C of the road vehicle 1).

Similarly, in case the driver operates the left lever 17 forward (arrow F) (and/or the right lever 14 backward, arrow B), the control unit 19 is configured to control the attitude angle $\beta$ so as to have the road vehicle 1 rotate in a clockwise direction, namely by having the left part 11 of the road vehicle 1 move forward and the right part 10 move backward (relative to the centre of gravity C of the road vehicle 1).

According to some preferred non-limiting embodiments, the control system 12 also comprises a longitudinal control assembly 21 provided with at least an accelerator control and a brake control.

In some preferred non-limiting cases, like the one shown in FIG. 3, the accelerator control is a pedal 22 and the brake control is a pedal 23. The pedals 22 and 23 are manufactured according to known techniques and, therefore, will not be described in detail below.

In other non-limiting cases, the accelerator control and/or the brake control are different, for example they are buttons or triggers installed on the joysticks 13 and/or 16.

According to a further aspect of the invention, there is provided a control method for a road vehicle 1 according to the description above.

The control method comprises the step of detecting, by means of first sensor elements 15 and/or second sensor elements 18, the kinematic value or the force imparted by the driver along the first direction TD or the second direction LD to the first lever 14 and/or to the second lever 17; in particular, the driver grasps the first lever 14 with the right hand and/or the second lever with the left hand.

Furthermore, the method comprises the step of adjusting the motion of the road vehicle 1 (by means of the control unit 19) based on the kinematic value or the force imparted by the driver to the first and/or second lever according to the disclosure of other parts of this description.

In addition, the method comprises the further steps of controlling the steering of the road vehicle 1 based on the kinematic value (for example, the angle $\alpha$) or the force detected by the first sensor elements 15 and/or by the second sensor elements 18 along the first direction TD; and controlling the attitude (in particular, the angle or the yaw of the road vehicle 1 based on the kinematic value (for example, the angle $\gamma$) or the force detected by the first sensor elements 15 and/or by the second sensor elements 18 along the second direction LD.

In particular, as mentioned above, depending on the kinematic value or on the force imparted by the driver along the first direction TD, namely along the transverse axis Y of the road vehicle 1, the control unit 19 controls the steering angle $\delta$ of the road vehicle 1.

Preferably, depending on the kinematic value or on the force imparted by the driver along the second direction TD, namely along the longitudinal axis X of the road vehicle 1, the control unit 19 controls the attitude angle $\beta$ of the road vehicle 1 while driving along a bend, so that the attitude angle $\beta$ is a function of the kinematic value (for example, of the angle $\gamma$) or of the force imparted to the first lever 14 and/or to the second lever 17 along the second direction LD.

Advantageously, though not necessarily, the method comprises the further steps of determining the desired attitude angle $\beta$ based on the kinematic value ($\alpha$) or on the force imparted to the first lever 14 and/or to the second lever 17 along the second direction LD; and controlling the generation of the driving or braking torque (or by operating active suspensions) to at least one of the drive wheels 2 and/or 3 (potentially to all drive wheels independently), so as to impart the desired attitude angle $\beta$ to the road vehicle 1 while driving along a bend. In particular, the considerations made above relating to the maximum angle $\beta_{MAX}$ also apply to the method.

Preferably, though not in a limiting manner, the method comprises the further step of imparting, to one of the first lever 14 and the second lever 17, a command corresponding to the one detected by the second sensor elements 18 or by the first sensor elements 15 and imparted by the driver to the other one of the second lever 17 and the first lever 14. In particular, as mentioned above, the first lever 14 and the second lever 17 are operated by the respective actuator system 20 to the same side along the first direction TD and to opposite sides along the second direction LD.

According to some non-limiting embodiments, which are not shown herein, the levers 14 and 17 are not linked to one another along the direction LD and, in order to control the attitude angle $\beta$, they can both be used, namely the attitude angle $\beta$ of the car 1 while driving along the bend is controlled depending on the position of both levers 14 and 17. In this case, it is possible that, while driving along the bend, the attitude angle $\beta$ is changed as a function of a misalignment of the two levers 14 and 17 in the longitudinal direction LD, so that the greater the misalignment of the two levers 14 and 17, the greater the attitude angle $\beta$; in other words, the attitude angle $\beta$ is zero when both levers 14 and 17 have the same position and becomes greater and greater as the difference between the positions of the two levers 14 and 17 increases.

The use of both levers 14 and 17 to control the attitude angle $\beta$ as indicated above (especially in case the actuator systems 20 act by keeping the tilt angles $\gamma$ opposite and equal to one another) while driving along a bend is particularly ergonomic, since it is easier and more intuitive for the driver to push the right lever 14 forward during a left turn and to pull the left lever backward, in accordance with the sides of the road vehicle 1, and vice versa in case of a left turn.

According to a possible embodiment, a change in the distribution of the braking is assumed to be zero in a position completely at rest (regardless of whether it is vertical or horizontal) of the levers 14 and 17 along the direction LD and the change in the distribution of the braking is assumed to be maximum in a completely forward or retracted position of the levers 14 and 17 along the direction LD.

The same reasoning obviously also applies in case of a force control.

In use, the steering (namely, the steering angle δ) of the road vehicle 1 takes place by tilting one or both joysticks 13, 16 to the left or to the right (the levers 14 and 17 are "virtually integral", namely by operating only one of the two levers 14 and 17, the other moves accordingly along the direction TD to the same side).

In particular, the control unit 19 can control the motion of the road vehicle 1 in different ways, for example thanks to the adoption of a steer by wire driving system (of a known kind and not described in detail below), which is completely mechanically disconnected from a traditional steering wheel (ideally not present) and can be controlled, for example, by means of a common electrically operated system or by means of split steering angle control systems on each front wheel 2 and, if necessary, also on each rear wheel 3 (for instance, in case of rear steering wheels in 4WS vehicles). In general, the control unit 19 acts upon the systems designed to carry out the steering function of the road vehicle 1.

Furthermore, in use, the control of the attitude of the road vehicle 1 while driving along a bend preferably takes place by tilting one or both joysticks 13, 16 forward or backward (in this case, again, the levers 14 and 17 are "virtually integral", but, unlike what happens with the commands imparted in the direction TD, by operating only one of the two levers 14 and 17, the other one moves accordingly along the direction LD to the opposite side).

In particular, the control unit 19 can control the motion of the road vehicle 1 in different ways, for example by assigning to the logics of the vehicle the task of operating the dynamic systems so as to set the desired attitude angle β and/or the desired yaw angle, for example by controlling the torque of one or more electric motors connected to the wheels 2, 3 or by acting upon one or more brakes, upon one or more suspensions, etcetera.

Even though the invention described above relates to a specific embodiment, it should not be considered as limited to said embodiment, for its scope of protection also includes all those variants, changes or simplifications covered by the appended claims, such as for example a different type of joystick, a different actuation to change the attitude angle or the yaw angle, a different rest configuration of the levers, a different type of vehicle, etcetera.

The apparatuses, the machine and the method described above have many advantages.

First of all, the control method described above allows for an increase in the ability to control the motion of the road vehicle (especially in a sports driving mode on a track) in a simple and intuitive manner (namely, in an ergonomic manner).

Furthermore, the control system disclosed above allows the driver to adjust the attitude angle, even without necessarily being an expert driver and in safety conditions.

In addition, the control system described above is particularly simple and economic to be implemented, as the pedals maintain their function, the steering of the vehicle is performed by the right/left controls and the adjustment of the attitude follows the vehicle dynamics (in particular, the shifting of the weights), since it is concordant with the desired positions of the respective sides of the vehicle.

LIST OF THE REFERENCE NUMBERS OF THE FIGS 1 road vehicle
2 front wheels
3 rear wheels
4 powertrain system
5 passenger compartment
6 cockpit
7 seat
8 rear part
9 front part
10 right part
11 left part
12 control system
13 first joystick
14 first lever
15 first sensor elements
16 second joystick
17 second lever
18 second sensor elements
19 control unit
20 actuator systems
21 control assembly
22 pedal
23 pedal
B backward
C centre of gravity
F forward
K spherical node
L left
LD second direction
R right
T trajectory
TD first direction
V driving speed
X longitudinal axis
Y transverse axis
Z vertical axis
α lateral tilt angle
β attitude angle
γ longitudinal tilt angle
δ steering angle

The invention claimed is:

1. Control system (12) for a road vehicle (1); the system comprises:
a first joystick (13), which in turn comprises a first lever (14) configured to be grasped by the right hand of a driver of the road vehicle (1); wherein the first joystick (13) comprises first sensor elements (15) for detecting a kinematic value or a force imparted by the driver to the first lever (14) along at least a first direction (TD) and a second direction (LD); or
a second joystick (16), which in turn comprises a second lever (17) configured to be grasped by the left hand of the driver of the road vehicle (1); wherein the second joystick (16) comprises second sensor elements (18) for detecting the kinematic value or the force imparted by the driver to the second lever (17) along at least the first direction (TD) and the second direction (LD); or the combination of first joystick (13) and second joystick (16);
a control unit (19) configured to adjust a motion of the road vehicle (1) according to the kinematic value or the force imparted by the driver to the first lever (14) or the second lever (17); or the combination of first lever (14) and second lever (17);
the control system (12) wherein: the control unit (19) is configured to control:
the steering of the road vehicle (1) as a function of the kinematic value or the force detected by the first sensor elements (15) or the second sensor elements (18) or the combination of first sensor elements (15) and second sensor elements (18) in the first direction (TD); and the attitude or the yaw of the road vehicle (1) as a function of the kinematic value or the force detected by the first sensor elements (15) or the second sensor elements (18) or combination of first sensor elements (15) and second sensor elements (18) along the second direction (LD).

2. System (12) according to claim 1, wherein the first direction (TD) extends along a transverse axis (Y) of the road vehicle (1) and the second direction (LD) extends along a longitudinal axis (X) of the road vehicle (1); in particular, wherein the first direction (TD) and the second direction (LD) are perpendicular to each other.

3. System (12) according to claim 1, wherein the kinematic value is the angular position of the first lever (14) or second lever (17) or combination of first lever (14) and second lever (17) about a spherical node (K).

4. System (12) according to claim 1, wherein the first joystick (13) and the second joystick (16) comprise actuator systems (20) configured to impart to one between the first and second levers (17) a command corresponding to that imparted by the driver on the other between the second lever (17) and first lever (14).

5. System (12) according to claim 1, wherein the first lever (14) and the second lever (17) are configured to be actuated with analogous verse along the first direction (TD).

6. System (12) according to claim 1, wherein the first lever (14) and the second lever (17) are configured to be actuated with opposite verse along the second direction (LD).

7. System (12) according to claim 1, wherein the control unit (19) is configured to control the motion of the road vehicle (1) to correspond a steering angle (δ) of to an angular position or a value of force impressed by the driver on the first lever (14) or the second lever (17) or combination of first lever (14) and second lever (17) along the first direction (TD).

8. System (12) according to claim 1, wherein the control unit (19) is configured to control the motion of the road vehicle (1) to correspond an attitude angle (β) or a yaw angle to an angular position or a value of force impressed by the driver on the first lever (14) or the second lever (17) or combination of first lever (14) and second lever (17) along the second direction (LD).

9. Road vehicle (1) comprising
four wheels (2, 3), at least two of which are drive wheels;
a power train system (4) configured to deliver torque to the drive wheels (2, 3);
the road vehicle (1) comprising a control system (12) according to claim 1.

10. Control method for a road vehicle (1) comprising the steps of:
detecting, by means of first sensor elements (15) or second sensor elements (18) or combination of first sensor elements (15) and second sensor elements (18), a kinematic value or a force imparted by the driver along at least a first direction (TD) and a second direction (LD) to a first lever (14) of a first joystick (13) or to a second lever (17) of a second joystick (16) or combination of first lever (14) of first joystick (13) and second lever (17) of second joystick (16); wherein the first lever (14) is grasped by the right hand of a driver of the road vehicle (1) or the second lever (17) is grasped by the left hand of the driver; or combination of the first lever (14) is grasped by the right hand of a driver of the road vehicle (1) and the second lever (17) is grasped by the left hand of the driver;

adjusting the motion of the road vehicle (1) according to the kinematic value or the force imparted by the driver to the first lever (14) or the second lever (17) or combination of first lever (14) and second lever (17);

the method of control comprises the further steps of:

controlling the steering of the road vehicle (1) according to the kinematic value or the force detected by the first sensor elements (15) or the second sensor elements (18) or combination of first sensor elements (15) and second sensor elements (18) along the first direction (TD); and controlling the attitude or the yaw of the road vehicle (1) according to the kinematic value or the force detected by the first sensor elements (15) or the second sensor elements (18) or combination of first sensor elements (15) and second sensor elements (18) along the second direction (LD).

11. Method according to claim 10 wherein, as a function of the kinematic value or the force imparted by the driver along the first direction (TD), a steering angle (δ) of the vehicle (1) is controlled.

12. Method according to claim 10 wherein, depending on the kinematic value or the force imparted by the driver along the second direction (LD), an attitude angle (β) of the road vehicle (1) is controlled while driving, such that the angle (β) of attitude is a function of the kinematic value or the force imparted to the first lever (14) or the second lever (17) or combination of first lever (14) and second lever (17) along the second direction (LD).

13. Method according to claim 12 and comprising the further steps of:
determining a desired attitude angle (β) as a function of the kinematic value or the force imparted to the first lever or second lever (17) or combination of first lever (14) and second lever (17) along the second direction (LD); and
piloting the generation of the driving or braking torque to at least one of the driving wheels (2, 3) in order to impart the desired attitude angle (β) to the road vehicle (1) during cornering.

14. A method according to claim 10, and comprising the further step of imparting, to one between the first lever (14) and the second lever (17), a command corresponding to the command imparted by the driver on the other between the second lever (17) and the first lever (14).

15. Method according to claim 10, wherein the first lever (14) and the second lever (17) are actuated with analogous verse along the first direction (TD); and wherein the first lever (14) and the second lever (17) are actuated with opposite verse along the second direction (LD).

* * * * *